(12) United States Patent
Kastle et al.

(10) Patent No.: US 12,418,223 B2
(45) Date of Patent: Sep. 16, 2025

(54) SYSTEM, APPARATUS, AND METHOD FOR MONITORING A GENERATOR

(71) Applicant: Caterpillar Inc., Peoria, IL (US)

(72) Inventors: Robert H. Kastle, Fayetteville, GA (US); Troy Roberts, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 904 days.

(21) Appl. No.: 17/552,403

(22) Filed: Dec. 16, 2021

(65) Prior Publication Data

US 2023/0198349 A1   Jun. 22, 2023

(51) Int. Cl.

| | |
|---|---|
| *H02K 11/35* | (2016.01) |
| *G01K 7/16* | (2006.01) |
| *G01K 7/18* | (2006.01) |
| *H02K 5/10* | (2006.01) |
| *H02K 5/22* | (2006.01) |
| *H02K 11/25* | (2016.01) |
| *H04B 10/25* | (2013.01) |
| *H04B 10/278* | (2013.01) |

(52) U.S. Cl.
CPC ............ *H02K 11/35* (2016.01); *G01K 7/16* (2013.01); *G01K 7/18* (2013.01); *H02K 5/10* (2013.01); *H02K 5/225* (2013.01); *H02K 11/25* (2016.01); *H04B 10/25* (2013.01); *H04B 10/278* (2013.01)

(58) Field of Classification Search
CPC .......... H02K 11/35; H02K 5/10; H02K 5/225; H02K 11/25; H04B 10/25
See application file for complete search history.

(56) References Cited

U.S. PATENT DOCUMENTS

| | | | |
|---|---|---|---|
| 7,208,855 B1 * | 4/2007 | Floyd | H02K 5/225 385/98 |
| 7,978,460 B2 | 7/2011 | Dykes | |
| | (Continued) | | |

FOREIGN PATENT DOCUMENTS

| | | |
|---|---|---|
| CN | 201311330 Y | 9/2009 |
| CN | 206611164 U | 11/2017 |
| CN | 210113700 U | 2/2020 |

OTHER PUBLICATIONS

Written Opinion and International Search Report for Int'l. Patent Appln. No. PCT/US2022/051896, mailed Apr. 3, 2023 (20 pgs).

(Continued)

*Primary Examiner* — Ricky Go
(74) *Attorney, Agent, or Firm* — Xsensus, LLP

(57) ABSTRACT

Generators, systems, and methods can comprise a resistance temperature detector (RTD) module; a controller area network (CAN) module; and an optical interface between the RTD module and the CAN module. The optical interface can be directly connected to each of the RTD module and the CAN module. The RTD module can be configured to convert first optical signals from the optical interface to first RTD signals and to convert second RTD signals to second optical signals for transmission through the optical interface to the CAN module. The CAN module can be configured to convert the second optical signals from the optical interface to first CAN signals and to convert second CAN signals to the first optical signals for transmission through the optical interface to the resistance temperature detector (RTD) module.

19 Claims, 6 Drawing Sheets

(56) References Cited

U.S. PATENT DOCUMENTS

| | | | |
|---|---|---|---|
| 9,540,136 B2 | 1/2017 | Cooksey et al. | |
| 2004/0071185 A1* | 4/2004 | Syracuse | G01J 5/0806 |
| | | | 374/E11.015 |
| 2010/0102684 A1 | 4/2010 | Dykes | |
| 2011/0109256 A1 | 5/2011 | Campbell et al. | |
| 2011/0198860 A1 | 8/2011 | Ktami et al. | |
| 2012/0075633 A1* | 3/2012 | Xia | H02K 11/35 |
| | | | 250/214 R |
| 2014/0341563 A1* | 11/2014 | Bohlinger | G05D 23/1934 |
| | | | 398/16 |
| 2016/0020666 A1 | 1/2016 | Fraysure, III et al. | |
| 2021/0175774 A1 | 6/2021 | More | |
| 2021/0311122 A1 | 10/2021 | Zhang et al. | |

OTHER PUBLICATIONS

Caterpillar, "Synergistic Effects of Alcohol-Based Renewable Fuels: Fuel Properties and Emissions", Application & Installation Guide, EMCP 4.3 and 4.4 Generator Set Control, 2013, 548 pages.

Axiomatic Global Electronic Solutions, "12 RTD Scanner", Technical Datasheet #TDAX184000, 2013, 7 pages.

* cited by examiner

SYSTEM, APPARATUS, AND METHOD FOR MONITORING A GENERATOR

TECHNICAL FIELD

Embodiments of the disclosed subject matter related to systems, apparatus, and methods for monitoring a generator.

BACKGROUND

Certain resistance temperature detector (RTD) monitors (e.g., low voltage) may not be suitable for medium and high voltage generators because such RTD monitors may not implement or otherwise may not comply with separation of circuits and/or accessible signal circuits requirements, for instance, as can be required by UL 2200 Third Edition (UL Standard for Safety Stationary Engine Generator Assemblies).

U.S. Pat. No. 7,978,460 ("the '460 patent") describes a generator set having a two-piece terminal box. According to the '460 patent, the terminal box may have a customer connection, a first housing piece configured to be mounted proximate a generator of the generator set, and at least one cable housed within the first housing piece to electrically connect the generator with the customer connection. The '460 patent also describes that the terminal box may also have a second housing piece mounted to the first housing piece distal the generator, and at least one control component housed within the second housing piece to regulate a characteristic of electrical power produced by the generator.

SUMMARY

According to an aspect of the present disclosure, a system for monitoring a genset is described, provided, or implemented. The system can comprise: a resistance temperature detector (RTD) module; a controller area network (CAN) module; and an optical interface between the resistance temperature detector (RTD) module and the controller area network (CAN) module, wherein the optical interface can be directly connected to each of the resistance temperature detector (RTD) module and the controller area network (CAN) module. The resistance temperature detector (RTD) module can be configured to convert first optical signals from the optical interface to first RTD signals and to convert second RTD signals to second optical signals for transmission through the optical interface to the controller area network (CAN) module, and/or the controller area network (CAN) module can be configured to convert the second optical signals from the optical interface to first CAN signals and to convert second CAN signals to the first optical signals for transmission through the optical interface to the resistance temperature detector (RTD) module.

According to another aspect a method is described or can be implemented. The method can comprise: providing a resistance temperature detector (RTD) module housed by a first housing; providing a controller area network (CAN) module housed by a second housing different from the first housing; and providing a fiber-optic cable to provide a communication connection between the resistance temperature detector (RTD) module and the controller area network (CAN) module. The resistance temperature detector (RTD) module can be configured to convert first optical signals from the fiber-optic cable to first RTD signals and to convert second RTD signals to second optical signals for transmission through the fiber-optic cable to the controller area network (CAN) module, and/or the controller area network (CAN) module can be configured to convert the second optical signals from the fiber optic cable to first CAN signals and to convert second CAN signals to the first optical signals for transmission through the fiber-optic cable to the resistance temperature detector (RTD) module.

According to yet another aspect of the present disclosure, a generator is described or can be implemented or provided. The generator can comprise: resistance temperature detector (RTD) circuitry operatively coupled to RTD wiring that senses temperature of the generator, the RTD circuitry being positioned in a high voltage compartment of a generator housing that houses at least part of the generator; controller area network (CAN) circuitry to output, to a CAN bus 30, signaling corresponding to temperature of the generator based on signals from the resistance temperature detector (RTD) circuitry corresponding to temperature of the generator as sensed by the RTD wiring; and a fiber-optic cable that couples the resistance temperature detector (RTD) circuitry to the controller area network (CAN) circuitry via respective optical interfaces of the resistance temperature detector (RTD) circuitry and the controller area network (CAN) circuitry. The controller area network (CAN) circuitry can be positioned entirely outside of the high voltage compartment of the generator housing, the fiber-optic cable can be the only way through which the signals from the resistance temperature detector (RTD) circuitry corresponding to the temperature of the generator are provided to the controller area network (CAN) circuitry, the optical interface of the resistance temperature detector (RTD) circuitry can be configured to convert optical signals from the fiber-optic cable to RTD signals, and/or the optical interface of the controller area network (CAN) circuitry can be configured to convert optical signals from the fiber-optic cable to CAN signals.

DETAILED DESCRIPTION

Embodiments of the disclosed subject matter are directed to systems, apparatus, and methods regarding a generator or a genset. For instance, embodiments of the disclosed subject matter are directed to systems, apparatus, and methods for monitoring a generator or a genset.

Generally, a generator set can include a combination of a generator and a prime mover, for example, a combustion engine. The generator and the prime mover can be mounted together along with other accessories on an anchor platform to form an integral unit commonly known as a genset. As fuel is burned within the prime mover, a mechanical rotation can be created that drives the generator to produce electrical power. A terminal box may be included within the genset and can houses electronic used to monitor and control genset operation, such that the electrical power is produced in a desired manner to have particular characteristics. For example, the terminal box may house transformers, voltage regulators, terminal strips, and customer connection points including, for example, bus bars and circuit breakers, for electrically connecting an external load to the genset.

Figure 1:
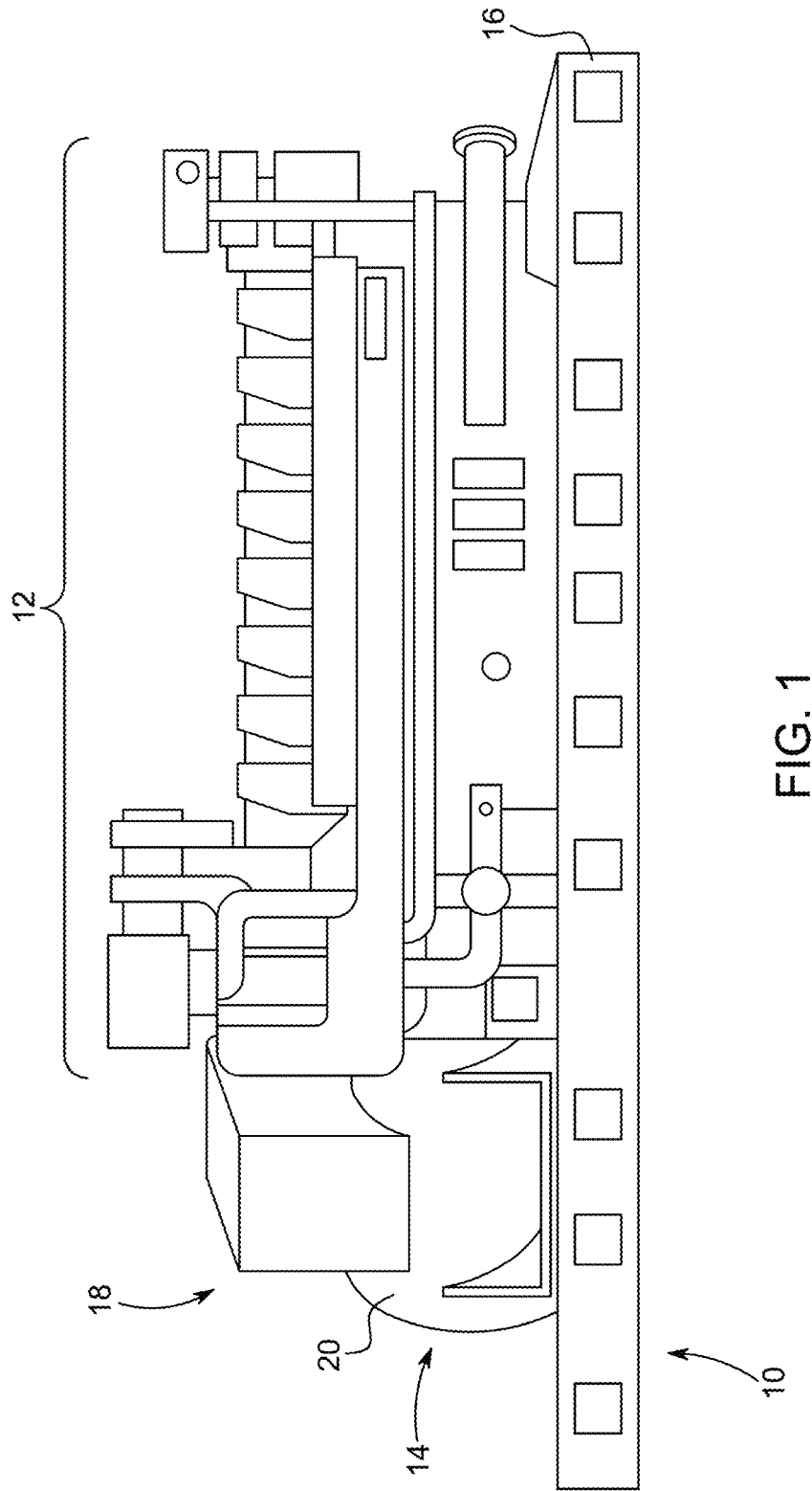
FIG. 1 is a diagram of a generator or generator set according to one or more embodiments of the disclosed subject matter.

FIG. 1 illustrates a generator set (genset) 10 having a prime mover 12 coupled to mechanically rotate a generator 14. For the purposes of this disclosure, prime mover 12 is depicted and described as a heat engine, for example, a combustion engine that combusts a mixture of fuel and air to produce the mechanical rotation. However, the prime mover 12 may be any type of combustion engine such as a diesel engine, a gasoline engine, or a gaseous fuel-powered engine. According to one or more embodiments, the genset 10 can comply with UL 2200 Third Edition (e.g., UL Standard for Safety Stationary Engine Generator Assemblies).

Generator 14 may be, for example, an AC induction generator, a permanent-magnet generator, an AC synchronous generator, or a switched-reluctance generator. In one embodiment, generator 14 may include multiple pairings of poles, each pairing having three phases arranged on a circumference of a stator to produce an alternating current with a frequency of 50 and/or 60 Hz, for instance. Electrical power produced by generator 14 may be directed for offboard purposes by way of one or more generator bus bars. According to one or more embodiments, the prime mover 12 and generator 14 may each be rigidly mounted to an anchor platform or rails 16. The genset 10 may be a stationary generator. The generator 14, according to embodiments of the disclosed subject matter, can have voltage and power specifications in the range of 208 volts to 13.8 kV and 100 eKW to 16.11 ekW (both ranges inclusive), respectively.

Genset 10 may also include a terminal box 18 mounted to generator 14 and in communication with prime mover 12 and/or generator 14 to monitor and regulate an electrical output of genset 10. For example, the terminal box 18 may be mounted to an outer casing (e.g., barrel) 20 of generator 14. In one embodiment, terminal box 18 may be a one-piece enclosure fabricated from stamped sheet metal that houses one or more electrical connection components along with one or more monitoring or control components, though embodiments of the disclosed subject matter are not so limited.

The terminal box 18 and the outer casing 20 may be referred to or characterized as a housing of the generator 14 or the genset 10, i.e., a generator housing or a genset housing, respectively. In that the outer casing 20 may house or otherwise be in proximity to the generator 14, the outer casing 20 may be referred to as a medium or high voltage (depending upon the type/size of the generator 14) section or compartment of the generator housing/genset housing. The terminal box 18 may be referred to as a low voltage section or compartment of the generator housing/genset housing. Put another way, voltage associated with one section or compartment proximate or relatively closer to the generator 14 can be greater than voltage associated with another section or compartment farther or separated from the generator 14.

Figure 2:
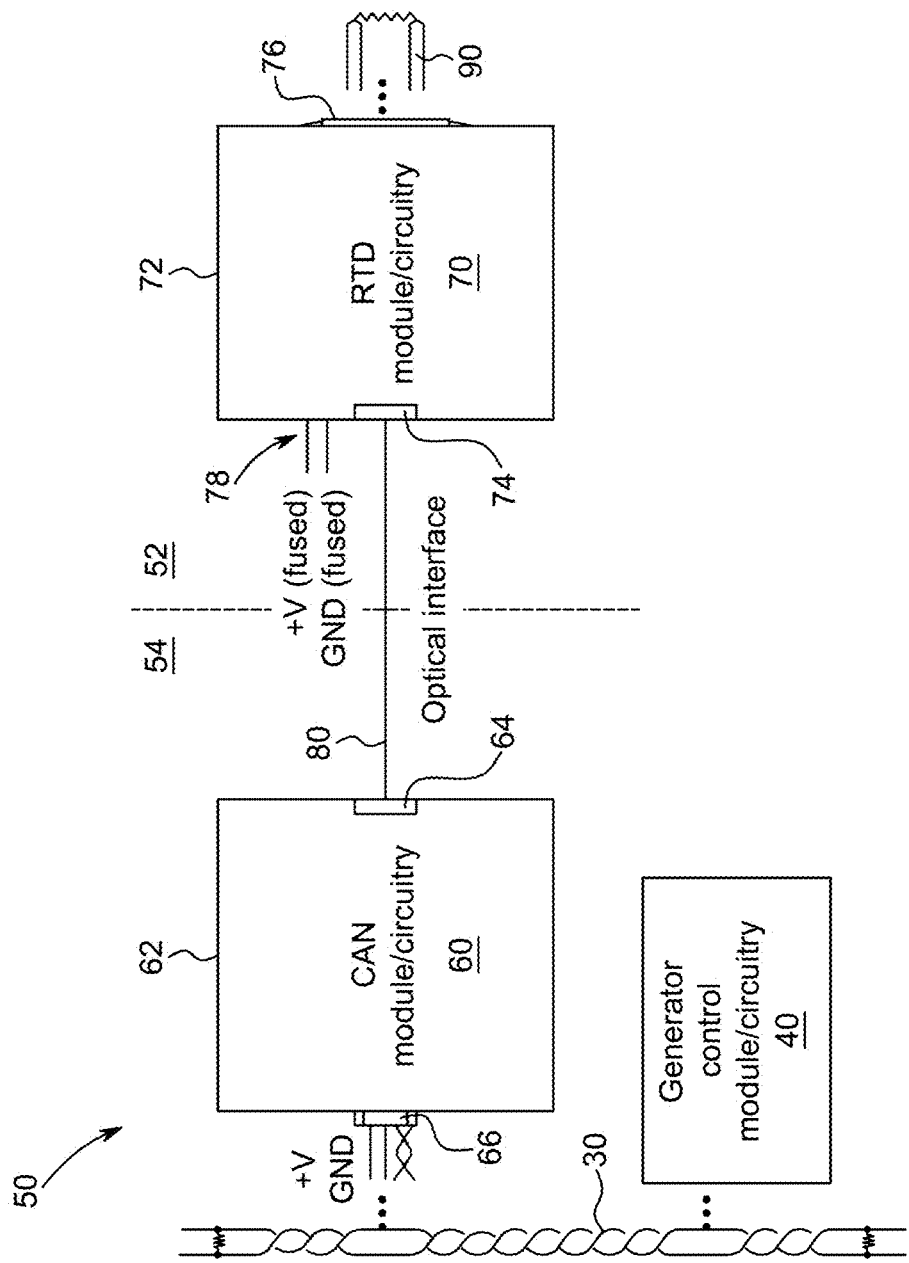
FIG. 2 is a block diagram of a system according to one or more embodiments of the disclosed subject matter.

Referring now to FIG. 2, a block diagram of a system 50 according to one or more embodiments of the disclosed subject matter. According to one or more embodiments, the system 50 may be referred to or characterized as a system for monitoring the genset 10 or portions thereof, such as the generator 14.

The system 50 can be comprised of a controller area network (CAN) module 60, a resistance temperature detector (RTD) module 70, and an optical interface 80.

The optical interface 80 can be a fiber-optic cable (also known as an optical fiber cable) and can directly couple or connect to the CAN module 60 at a first end and to the RTD module 70 at a second end thereof opposite the first end. The optical interface 80 can connect to an optical interface circuitry 64 of the CAN module 60 and to an optical interface circuitry 74 of the RTD module 70. The optical interface 80 can directly connect the CAN module 60 to the RTD module 70 without any intervening components (other than the optical interface 80). Thus, according to one or more embodiments, communication between the CAN module 60 and the RTD module 70 may only be performed by way of the optical interface 80. The optical interface 80 may include only one optical fiber or otherwise include only one optical signal passage. Thus, the optical interface 80 can pass optical signals in series, based on corresponding CAN signals from the CAN module 60, to the RTD module 70, and likewise can pass optical signals in series, based on corresponding RTD signals from the RTD module 70, to the CAN module 60. As examples, the optical interface 80 in the form of fiber-optic cable can have a diameter of ⅛ to 1/16 of an inch.

The RTD module 70 can be provided or positioned within a first compartment or section 52 of the genset 10 or the generator 14 (the vertical dashed line in FIG. 2 can represent a wall of the first compartment or section 52). For instance, the first compartment or section 52 can be a medium or high voltage section of the genset 10 or the generator 14, such as the outer casing 20. The CAN module 60 can be provided entirely outside of the first compartment or section 52. According to one or more embodiments, the CAN module 60 can be provided or positioned within a second compartment or section 54. The second compartment or section 54 can be part of the genset 10 or generator 14. For instance, the second compartment or section 54 can be a low voltage section of the genset 10 or the generator 14, such as the terminal box 18. Alternatively, the second compartment or section 54 can be different from the genset 10 or generator 14, for instance, remote from the genset 10 or generator 14 (e.g., in a room different from a room in which the genset 10 or generator 14 is provided, a building different from a building in which the genset 10 or generator 14 is provided). A portion of the optical interface 80 can be provided in the second compartment or section 54 and can extend to the RTD module 70, particularly the optical interface circuitry 74 thereof. The optical interface 80 can therefore extend from the first compartment or section 52.

The RTD module 70 can include or be provided in a first housing or enclosure 72. The first housing 72 can be a sealed enclosure, for instance, a liquid (e.g., water)-tight housing. Similarly, the CAN module 60 can include or be provided in a second housing or enclosure 62. The second housing 62 can be a sealed enclosure, for instance, a water-tight housing. The first housing 72 can be mounted in the first compartment or section 52, which, as noted above, can be a medium or high voltage section of the genset 10 or the generator 14. The second housing 62 can be mounted entirely outside of the first compartment or section 52, for instance, in the second compartment or section 54, which, as noted above, can be a low voltage section of the genset 10 or the generator 14.

The CAN module 60 can include a connector 66, which can extend from or otherwise be externally accessible relative to the housing 62. According to one or more embodiments, the connector 66 can be a liquid (e.g., water)-tight connector. The connector 66 may be referred to herein as a second connector or a second liquid/water-tight connector. The connector 66 can be to electrically connect the CAN module 60 to a CAN bus 30 of a CAN (J1939) network associated with the genset 10. The connector 66 can also provide power to the CAN module 60.

The input voltage range for the connector 66 can be from 9 to 32 VDC (inclusive), as an example. Software programming/updating for the RTD module 70 can be performed across the CAN connections of the connector 66, i.e., the CAN data link, and via the optical interface 80.

Figure 3A:
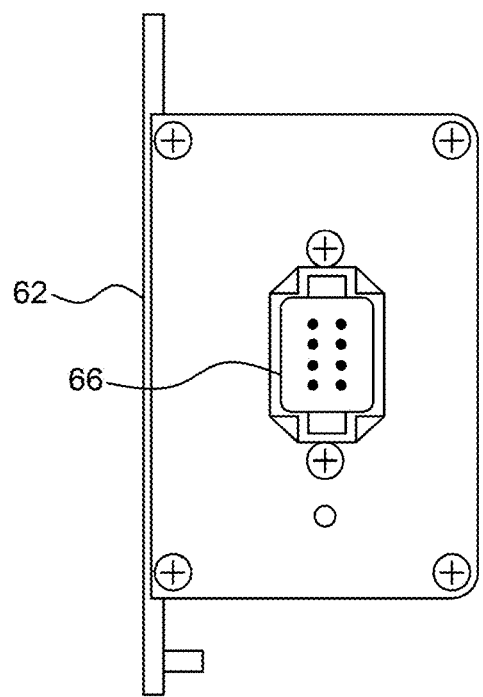
FIG. 3A is a diagram showing a plug receptacle of a controller area network (CAN) module according to one or more embodiments of the disclosed subject matter.
Figure 3B:
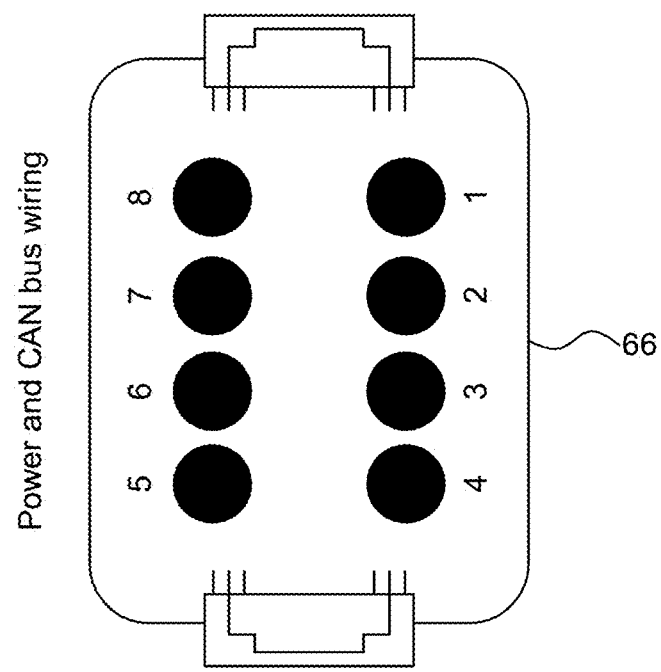
FIG. 3B is an enlarged view of the plug receptacle of FIG. 3A.

FIG. 3A and FIG. 3B show an example of the connector 66. In the example shown in FIG. 3A and FIG. 3B, the connector can be an 8-pin connector. As a specific example, the connector 66 can be a Deutsch DT13-08PA connector. As noted above, the connector 66 can accommodate power and CAN signaling. The connector 66 may be referred to or characterized as a CAN connector.

The RTD module 70 can include a connector 76, which can extend from or otherwise be externally accessible relative to the housing 72. According to one or more embodiments, the connector 76 can be a liquid (e.g., water)-tight connector. The connector 76 may be referred to herein as a first connector or a first liquid/water-tight connector. The connector 76 can be to electrically connect the RTD module 60 to RTD wiring 90 provided to sense temperature of the generator 14. Incidentally, the RTD wiring 90, i.e., some or all of the individual wires, can exit the rear or the top of the outer casing 20 to/from the RTD module 60. The RTD wiring 90 may exit the stator with the generator mag wire and can pass through an opening in the outer casing 20. Such opening in the outer casing 20 may be the same opening through which power cables for the generator 14 pass.

Voltage signals from the RTD wiring 90, which can correspond to and be representative of temperature of the generator 14, can be received by the RTD module 70 via the connector 76. Discussed in more detail below, signals based on the temperature signals received by the RTD module 70 can be sent to the CAN bus 30 via the RTD module 70, the optical interface 80, and the CAN module 60.

Figure 4A:
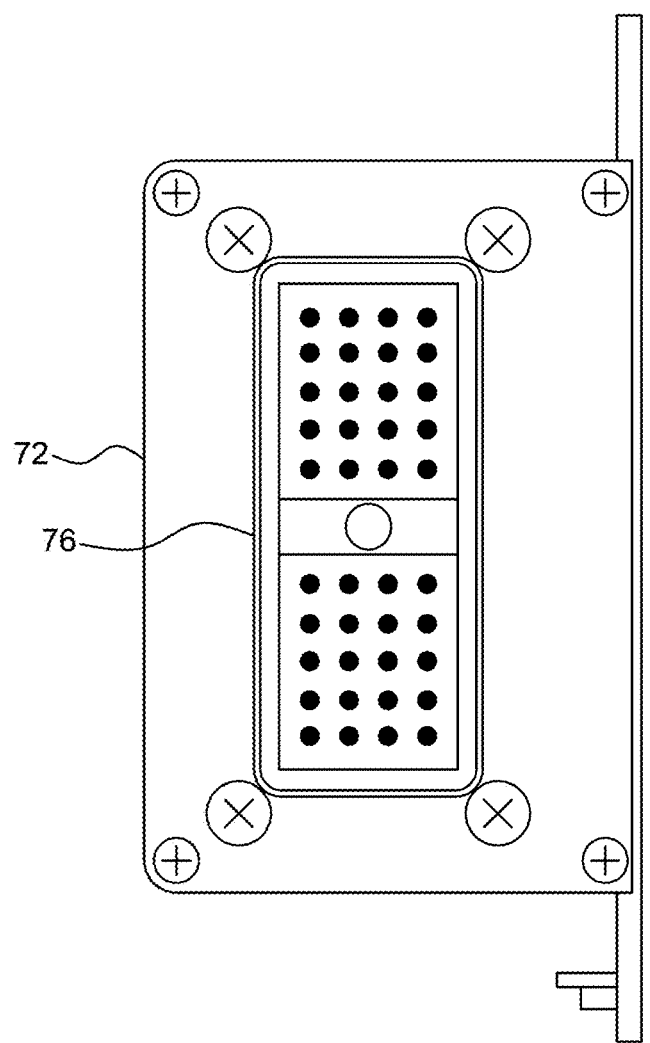
FIG. 4A is a diagram showing a plug receptacle of a resistance temperature detector (RTD) module according to one or more embodiments of the disclosed subject matter.
Figure 4B:
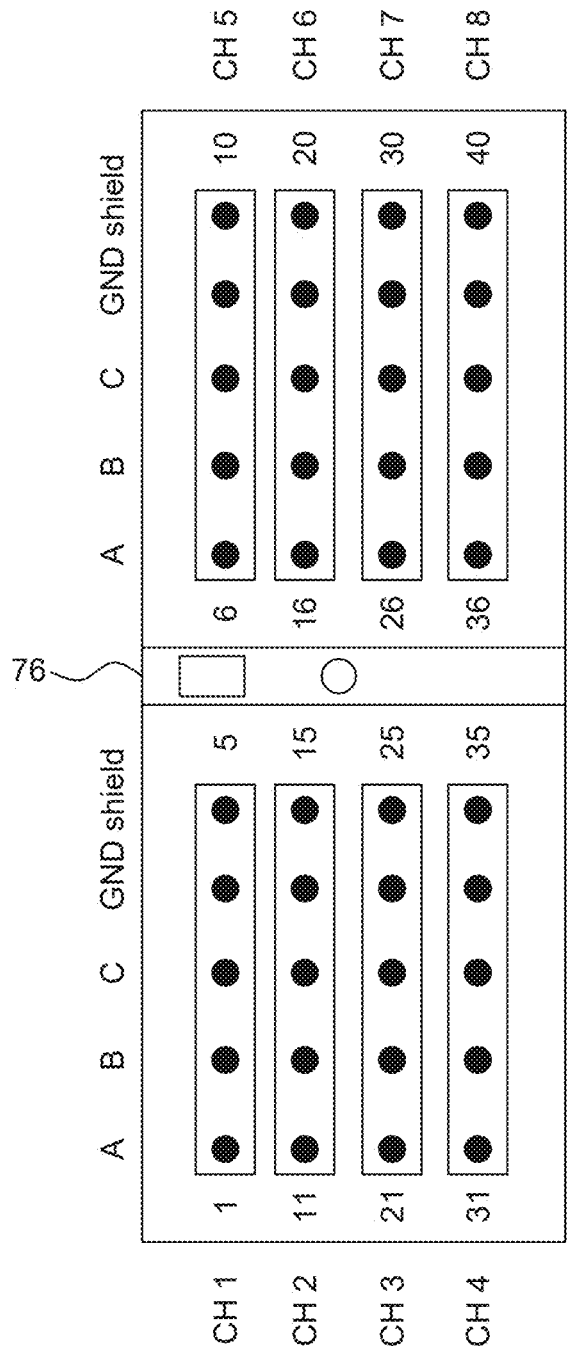
FIG. 4B is an enlarged view of the plug receptacle of FIG. 4A.

FIG. 4A and FIG. 4B show an example of the connector 76. In the example shown in FIG. 4A and FIG. 4B, the connector can be a 40-pin connector. As a specific example, the connector 76 can be a Deutsch DRC13-40PA connector. As noted above, the connector 76 can receive RTD sensor wiring 90 as inputs.

Referring again to FIG. 2, the RTD module 70 can also include a power interface 78. The power interface 78 can be different from the connector 76 of the RTD module 70. Generally, the power interface 78, which can be connector, for instance, a plug, can provide power to the RTD module 70. As an example, the input voltage for the power interface 78 can be 24 VDC. Ground may also be provided as an input as part of the power interface 78. According to one or more embodiments of the disclosed subject matter, the power interface 78 can be fuse-isolated. Fuse-isolated can mean or include fusible traces and optionally the terminals being fused. For instance, the supply lines of the power interface 78 can be fused to meet requirements for UL 2200 Third Edition. The supply lines for the power interface 78 can be labeled to indicate that they are fuse protected. High voltage sleeving can be provided over the power lines. In light of the power interface 78, the RTD module 70 may be referred to or characterized as being connectorized (i.e., only the connector 76) except for the power interface 78.

The RTD module 70 can be isolated from the CAN module 60 via the optical interface 80, since the optical interface 80 does not conduct electricity. Thus, a short circuit within the RTD module 70 can be prevented from reaching the CAN module 60. The optical interface 80, thus, can provide an electrically isolated interface to the CAN module 60.

The RTD module 70 can be implemented in or using one or more processors. The processor(s) may be implemented in or using circuitry. Thus, the RTD module 70 can be characterized as RTD circuitry.

From the connector 76 of the RTD module 70, the RTD module 70 can take the inputs from the thermocouples of the RTD wiring 90 and convert to corresponding signals. Such signals may be referred to herein as RTD signals (which may be electrical signals). The RTD module 70 can then convert the RTD signals to optical signals for transmission over the optical interface 80. According to one or more embodiments, the optical interface circuitry 74 of the RTD module 70 can convert the RTD signals to the optical signals for transmission over the optical interface 80.

The RTD module 70 can also receive optical signals from the optical interface 80 and convert such signals to RTD signals. According to one or more embodiments, the optical interface circuitry 74 of the RTD module 70 can convert the optical signals from the optical interface 80 to RTD signals. Such signaling may originate from a main or genset control module 40, which may be implemented in or using one or more processors, wherein the processor(s) may be implemented in or using circuitry. Optionally, the signaling may be to program or update the RTD module 70.

The CAN module 60 can be implemented in or using one or more processors. The processor(s) may be implemented in or using circuitry. Thus, the CAN module 60 can be characterized as CAN circuitry. According to one or more embodiments, the CAN module 60 can include or otherwise implement a CAN controller and a CAN transceiver.

From the connector 66 of the CAN module 60, the CAN module 60 can receive CAN signals from the CAN bus 30, for instance, from the main control module 40. The CAN signals can be converted by the CAN module 60 to optical signals for transmission over the optical interface 80. According to one or more embodiments, the optical interface circuitry 64 of the CAN module 60 can convert the CAN signals to optical signals for transmission over the optical interface 80.

The CAN module 60 can also receive optical signals from the optical interface 80. Such signals can be representative of the temperature of the generator 14, as sensed using the RTD wiring 90. As noted above, the optical interface 80 can be the only way in which the temperature-related signaling based on the sensing of the RTD wiring 90 can be provided to the CAN module 60. The optical signals can be converted to CAN signals. According to one or more embodiments, the optical interface circuitry 64 of the CAN module 60 can convert the optical signals to CAN signals. The converted CAN signals, which can be representative of temperature of the generator 14, can be sent to the CAN bus 30 via the connector 66 and, for example, to the main control module 40.

When the CAN module 60, the optical interface 80, and the RTD module 70 are initially connected to the CAN bus 30 via the connector 66, the combination of the components can be identified in the CAN network as a single CAN device. Thus, the CAN network can be defined by the components connected to the CAN bus 30, which may include the RTD module 70 (via the CAN module 60 and the optical interface 80), as well as one or more of an ECM, a voltage regulator, a generator controller (e.g., main controller 40), enunciators, telematics, etc.

Industrial Applicability

As noted above, embodiments of the disclosed subject matter related to systems, apparatus, and methods for monitoring a generator.

Generally, one or more embodiments of the disclosed subject matter can provide an RTD (resistance temperature detector) monitor associated with a generator set (genset) or a generator. The RTD monitor can include an RTD module which is connected to a CAN-to-optical converter via a fiber-optic cable. Further, the RTD module can be mounted in a medium/high voltage compartment of the generator set, and the CAN-to-optical converter can be placed in a low voltage compartment of the generator set. Further, the fiber-optic cable can be configured to perform a separation of circuits and signals of a medium/high voltage input of the RTD module, thereby executing optical voltage isolation (i.e., low voltage).

Further, the RTD monitor, or portions thereof, can be a compact package which may be installed inside the generator set. For instance, the RTD module (e.g., RTD module 70) can be about 4-5 inches tall. The CAN module 60 can be slightly smaller.

As noted above, the RTD module 70 of the RTD monitor can be provided (e.g., mounted or installed) in a first compartment or section 52 of the genset 10 or the generator 14, wherein the first compartment or section 52 can be a medium or high voltage compartment/section of the genset 10/generator 14, such as the outer casing 20. Also discussed above, the CAN module 60 of the RTD monitor can be external to the first compartment or section 52. Such split-configuration of the RTD module 70 and the CAN module 60 separated (but connected) by the optical interface 80, can thus allow for only the RTD module 70 being provided in the medium or high voltage section 52, notably where the optical interface 80 is not susceptible to interference caused by the medium or high voltage operation of the generator 14, where the CAN module 60 may otherwise be susceptible if not for now being separated from the medium or high voltage environment by the optical interface 80. The optical interface 80 can thus provide a relatively high input voltage isolation for the signaling input to the RTD module 70, for instance, satisfying the requirements of UL 2200 Third Edition (e.g., 15 kV input isolation or with an isolation voltage not less than the Dielectric Voltage-Withstand test potential refer to UL2200 Table 69.1). The RTD monitor can also meet other requirements for UL 2200 Third Edition, including vibration, heat, etc.

Figure 5:
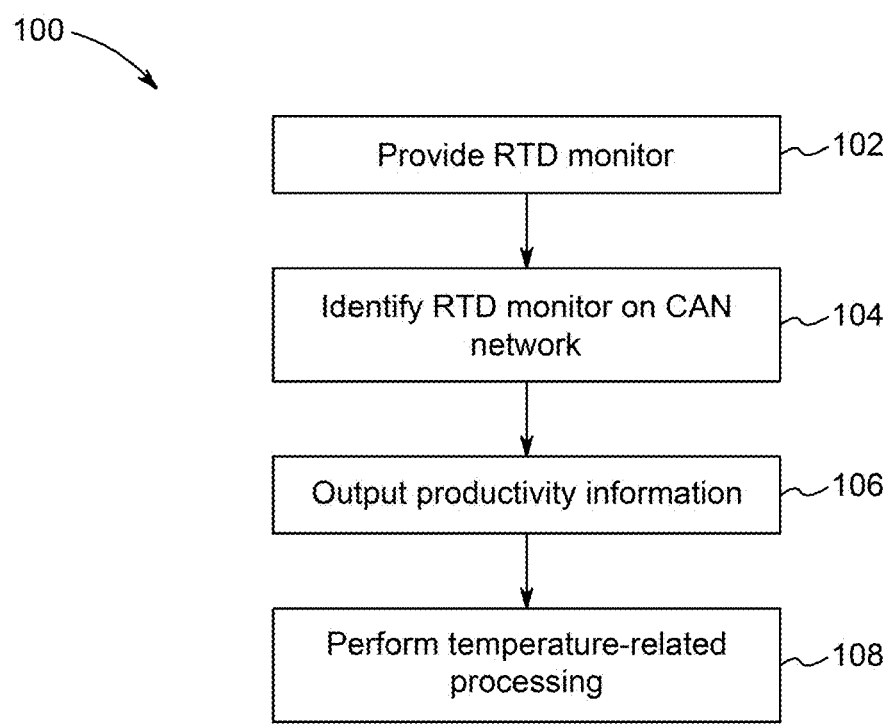
FIG. 5 is a flow chart of a method according to one or more embodiments of the disclosed subject matter.

FIG. 5 is a flow chart of a method 100 according to embodiments of the disclosed subject matter. One or more portions of the method 100 can be performed via a non-transitory computer-readable storage medium (or media) having stored thereon instructions that, when executed by one or more processors (of CAN module 60, RTD module 70, and/or main control module 40), causes the one or more processors to perform the portion(s) of the method 100. According to one or more embodiments, the method 100 may be referred to or characterized as a method for monitoring a (e.g., genset 10) or portions thereof, such as a generator thereof (e.g., generator 14).

At 102 the method 100 can include providing the RTD monitor, or portions thereof, including the CAN module 60, RTD module 70, and the optical interface 80. As noted above, the optical interface 80 can be connected at opposite ends to the CAN module 60 and the RTD module 70 to provide a two-way communication connection between the CAN module 60 and the RTD module 70. The RTD module 70 can be provided in the first compartment or section 52 and the CAN module 60 can be provided in the second compartment or section 54. The RTD module 70, particularly the connector 76 thereof, can be connected to RTD sensor wiring 90. The CAN module 60, particularly the connector 66 thereof, can be connected to the CAN bus 30.

The method 100, at 104, can include identifying the RTD monitor comprised of the CAN module 60, the optical interface 80, and the RTD module 70, on the CAN network. As noted above, the combination of components can be identified as a single CAN device.

Optionally, at 106, the method 100 can include programming or updating the RTD module 70 by sending programming signaling from the CAN bus 30 to the RTD module 70 via the CAN module 60 and the optical interface 80. By providing the ability to program the RTD module 70 over the optical interface 80, this can avoid the need to tag-out the main panel. The programming can involve the conversion of CAN signals to optical signals by the CAN module 60 and the conversion of optical signals from the optical interface 80 to RTD signals by the RTD module 70.

At 108 the method 100 can process temperature-related signals or data based on measurements from the RTD sensor wiring 90 received at the RTD module 70, particularly at the connector 76 thereof. This can involve the RTD module 70 taking the inputs from the thermocouples of the RTD wiring 90 and converting to corresponding RTD signals. The RTD module 70 can then convert the RTD signals to optical signals for transmission over the optical interface 80. The CAN module 60 can receive the optical signals from the optical interface 80 and convert the optical signals to CAN signals that are representative of the detected temperature of the genset 10/generator 14. Such temperature signals can be sent from the CAN module 60 to the CAN bus 30 and to another processor or controller, such as the main control module 40.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Further, as used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present. This definition of "circuitry" can apply to all uses of this term in this application, including in any claims. As a further example, as used in this application, the term "circuitry" can also cover an implementation of merely a processor (or multiple processors) or portion of a processor and its (or their) accompanying software and/or firmware.

Use of the terms "data," "content," "information" and similar terms may be used interchangeably, according to some example embodiments of the present disclosure, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Aspects of the present disclosure have been described above with reference to flowchart illustrations and/or block diagrams of methods, apparatus (systems) and computer program products according to embodiments of the present disclosure. In this regard, the flowchart and block diagrams in the Figures illustrate the architecture, functionality, and operation of possible implementations of systems, methods and computer program products according to various embodiments of the present disclosure. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or "one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A generator comprising:
  resistance temperature detector (RTD) circuitry operatively coupled to RTD wiring that senses temperature of the generator, the RTD circuitry being positioned in a high voltage compartment of a generator housing that houses at least part of the generator;
controller area network (CAN) circuitry to output, to a CAN bus, signaling corresponding to temperature of the generator as sensed by the RTD wiring; and
a fiber-optic cable that couples the resistance temperature detector (RTD) circuitry to the controller area network (CAN) circuitry via respective optical interfaces of the resistance temperature detector (RTD) circuitry and the controller area network (CAN) circuitry,
wherein the controller area network (CAN) circuitry is positioned entirely outside of the high voltage compartment of the generator housing,
wherein the fiber-optic cable is the only way through which the signals from the resistance temperature detector (RTD) circuitry corresponding to the temperature of the generator are provided to the controller area network (CAN) circuitry,
wherein the optical interface of the resistance temperature detector (RTD) circuitry is configured to convert optical signals from the fiber-optic cable to RTD signals,
wherein the optical interface of the controller area network (CAN) circuitry is configured to convert optical signals from the fiber-optic cable to CAN signals, and
wherein the fiber-optic cable is the only signal connection interface between the controller area network (CAN) circuitry and the resistance temperature detector (RTD) circuitry.

2. The generator according to claim 1, wherein the controller area network (CAN) circuitry is positioned in a low voltage compartment of the generator housing.

3. The generator according to claim 1, wherein the controller area network (CAN) circuitry is positioned remote from the generator housing, a portion of the fiber-optic cable extending from the generator housing to the controller area network (CAN) circuitry.

4. The generator according to claim 1, further comprising:
a first sealed enclosure that encloses the resistance temperature detector (RTD) circuitry and that includes a first liquid-tight connector to connect with the RTD wiring; and
a second sealed enclosure different from the first sealed enclosure that encloses the controller area network (CAN) circuitry and that includes a second liquid-tight connector to connect with the CAN bus associated with the generator,
wherein the first sealed enclosure includes a power plug to provide power to the resistance temperature detector (RTD) circuitry, and
wherein the power plug is fuse-isolated.

5. The generator according to claim 4,
wherein the first liquid-tight connector of the first sealed enclosure is a 40-pin connector,
wherein the second liquid-tight connector of the second sealed enclosure is an 8-pin connector,
wherein an input voltage range for the 8-pin connector is 9 to 32 VDC, and
wherein an input voltage for the power plug is 24 VDC.

6. The generator according to claim 1, wherein the fiber-optic cable includes only one optical fiber.

7. The generator according to claim 1, wherein the controller area network (CAN) circuitry, the fiber-optic cable, and the resistance temperature detector (RTD) circuitry are identified on the CAN bus as a single CAN device.

8. A method comprising:
providing a resistance temperature detector (RTD) module housed by a first housing;
providing a controller area network (CAN) module housed by a second housing different from the first housing;
providing a fiber-optic cable to provide a communication connection between the resistance temperature detector (RTD) module and the controller area network (CAN) module;
receiving, at the resistance temperature detector (RTD) module, temperature signals from the RTD wiring that senses temperature of a generator associated with the resistance temperature detector (RTD) module;
outputting, from the resistance temperature detector (RTD) module, the second optical signals corresponding to the received temperature signals, wherein said outputting the second optical signals includes converting, by the resistance temperature detector (RTD) module, the second RTD signals, which correspond to the received temperature signals, to the second optical signals corresponding to the received temperature signals; and
outputting the first CAN signals corresponding to the received second optical signals, wherein outputting the first CAN signals includes converting, by the controller area network (CAN) module, the received second optical signals to the first CAN signals,
wherein the resistance temperature detector (RTD) module is configured to convert first optical signals from the fiber-optic cable to first RTD signals and to convert second RTD signals to second optical signals for transmission through the fiber-optic cable to the controller area network (CAN) module, and
wherein the controller area network (CAN) module is configured to convert the second optical signals from the fiber optic cable to first CAN signals and to convert second CAN signals to the first optical signals for transmission through the fiber-optic cable to the resistance temperature detector (RTD) module.

9. The method according to claim 8,
wherein said providing the resistance temperature detector (RTD) module includes mounting the first housing within a medium or high voltage compartment of a generator housing that houses a stationary generator, and
wherein said providing the controller area network (CAN) module includes mounting the second housing outside of the medium or high voltage compartment of the generator housing.

10. The method according to claim 8, further comprising outputting the first optical signals from the controller area network (CAN) module to the resistance temperature detector (RTD) module, wherein said outputting the first optical signals includes converting, using the controller area network (CAN) module, the second CAN signals to the first optical signals for output over the fiber-optic cable.

11. The method according to claim 8, further comprising initially identifying the controller area network (CAN) module, the fiber-optic cable, and the resistance temperature detector (RTD) module on a CAN network associated with a generator and for which the controller area network (CAN) module, the fiber-optic cable, and the resistance temperature detector (RTD) monitor,
wherein the controller area network (CAN) module, the fiber-optic cable, and the resistance temperature detector (RTD) module are initially identified as a single CAN device on the CAN network.

12. The method according to claim 8, wherein the first housing is a first water-tight housing from which is provided a first liquid-tight connector to electrically connect the resistance temperature detector (RTD) module with RTD wiring that senses temperature of a generator, wherein the second housing is a second water-tight housing from which is provided a second liquid-tight connector to electrically connect the controller area network (CAN) module with a CAN bus associated with the generator, wherein a power interface, different from the first liquid-tight connector, provides power to the resistance temperature detector (RTD) module, and wherein the power interface is fuse-isolated.

13. The method according to claim 8, further comprising sending programming signals from the controller area network (CAN) module to the resistance temperature detector (RTD) module via the fiber-optic cable in the form of the second CAN signals, the first optical signals, and the first RTD signals.

14. A system for monitoring a genset comprising:

a resistance temperature detector (RTD) module;

a controller area network (CAN) module; and a bidirectional optical interface between the resistance temperature detector (RTD) module and the controller area network (CAN) module, the bidirectional optical interface being directly connected to each of the resistance temperature detector (RTD) module and the controller area network (CAN) module, wherein the resistance temperature detector (RTD) module is configured to convert first optical signals from the bidirectional optical interface to first RTD signals and to convert second RTD signals to second optical signals for transmission through the bidirectional optical interface to the controller area network (CAN) module, and wherein the controller area network (CAN) module is configured to convert the second optical signals from the bidirectional optical interface to first CAN signals and to convert second CAN signals to the first optical signals for transmission through the bidirectional optical interface to the resistance temperature detector (RTD) module.

15. The system for monitoring the genset according to claim 14, wherein the resistance temperature detector (RTD) module is provided within a medium or high voltage section of a housing that houses at least a portion of the genset, wherein the controller area network (CAN) module is entirely outside of the medium or high voltage section of the housing that houses at least a portion of the genset, and wherein the controller area network (CAN) module is positioned in a low voltage section of the housing that houses at least the portion of the genset.

16. The system for monitoring the genset according to claim 14, wherein the resistance temperature detector (RTD) module includes a first liquid-tight connector to connect processing circuitry of the resistance temperature detector (RTD) module with RTD wiring that senses temperature of the genset, wherein the controller area network (CAN) module includes a second liquid-tight connector to connect processing circuitry of the controller area network (CAN) module with a CAN bus associated with the genset, wherein the resistance temperature detector (RTD) module includes a power interface to provide power to the resistance temperature detector (RTD) module, and wherein the power interface of the resistance temperature detector (RTD) module is fuse-isolated.

17. The system for monitoring the genset according to claim 16, wherein the first liquid-tight connector of the resistance temperature detector (RTD) module is a 40-pin connector, wherein the second liquid-tight connector of the controller area network (CAN) module is an 8-pin connector, wherein an input voltage range for the 8-pin connector is 9 to 32 VDC, and wherein an input voltage for the power interface is 24 VDC.

18. The system for monitoring the genset according to claim 14, wherein the bidirectional optical interface is an optical fiber cable having only one optical signal passage.

19. The system for monitoring the genset according to claim 14, wherein the controller area network module is configured to send programming signaling to the resistance temperature detector (RTD) module via the bidirectional optical interface.

* * * * *